Nov. 17, 1964     C. W. BAUGH     3,157,305
NOSE ASSEMBLY
Filed Oct. 5, 1961     2 Sheets-Sheet 1
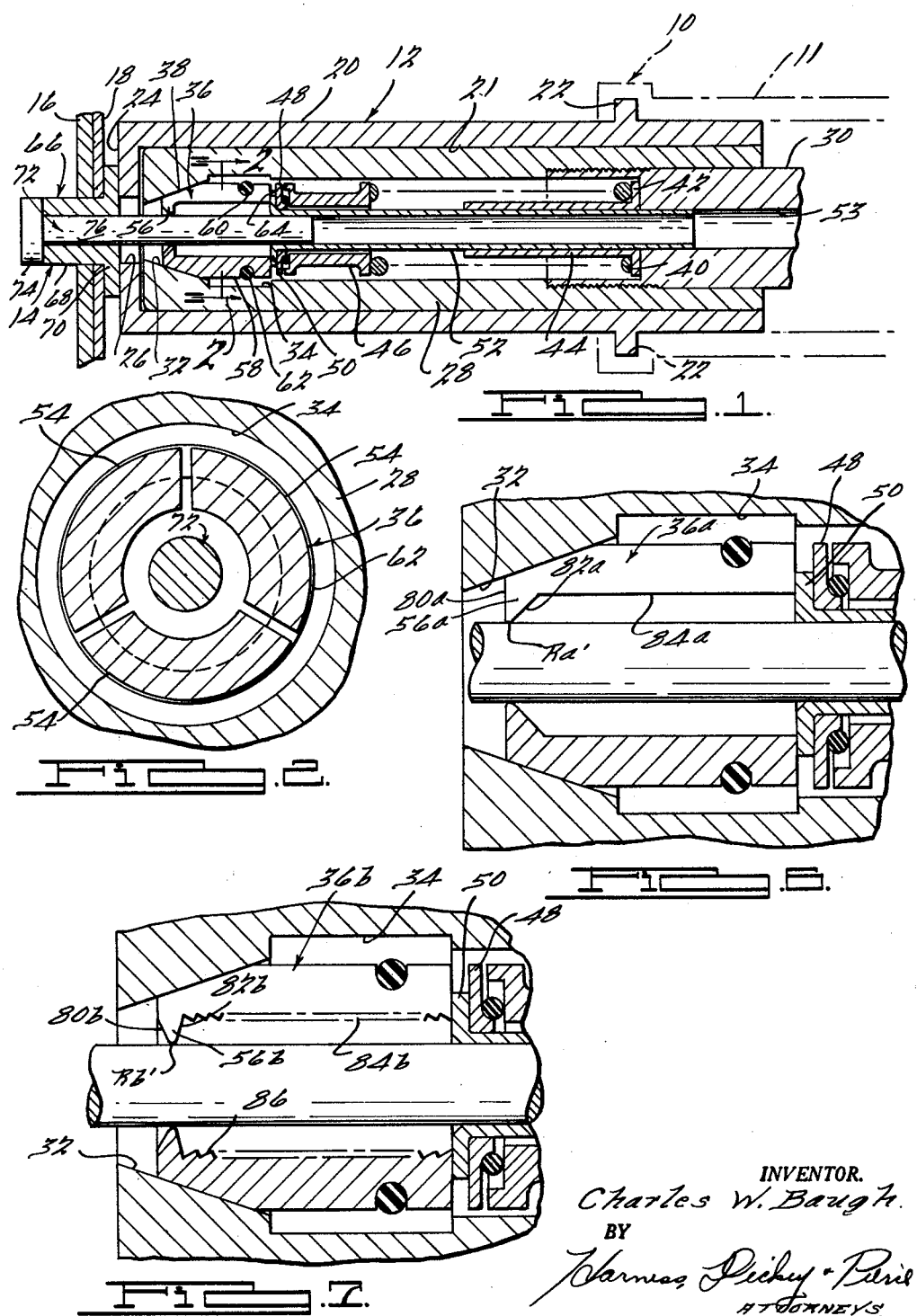
INVENTOR.
Charles W. Baugh.
BY
Harness, Dickey & Pierce
ATTORNEYS Nov. 17, 1964    C. W. BAUGH    3,157,305
NOSE ASSEMBLY
Filed Oct. 5, 1961    2 Sheets-Sheet 2

INVENTOR.
Charles W. Baugh.
BY
Harness, Dickey & Pierce
ATTORNEYS

3,157,305
NOSE ASSEMBLY
Charles W. Baugh, St. Clair Shores, Mich., assignor to Huck Manufacturing Company, Detroit, Mich., a corporation of Michigan
Filed Oct. 5, 1961, Ser. No. 143,209
13 Claims. (Cl. 218—42)

This invention relates to apparatus for and a method of setting fasteners.

In general, the apparatus and methods of this invention are applicable to the setting of a multiple component fastener, for example, of the type comprising a collar or sleeve and a pin and being used to join a pair of workpieces together. The conventional tool for setting such a fastener or rivet has a jaw assembly for gripping the pin and an anvil to bear against the collar. The fastener is set by the application of a relative axial force between the anvil and the jaw assembly and hence between the collar and a head on the pin. The pin which has a shank integral with the head is provided with a plurality of pulling grooves in the shank to facilitate being gripped by the jaw assembly.

There would be a decided advantage is being able to set rivets of the type described above by use of pins having plain shanks or without the preformed pull grooves. The apparatus and method of this invention are applicable to the setting of a fastener having such a pin. It would be a further advantage if a fastener of the type above described could be set using pins having shanks of various constructions, i.e. with pull grooves, without pull grooves or plain, threaded, etc. The apparatus and method of this invention are applicable to setting a fastener using such various types of pins.

Therefore, it is an object of this invention to provide apparatus for setting fasteners of the above described type using pins without preformed pull grooves on the shank.

It is another object of this invention to provide apparatus for setting fasteners of the above described type using pins having plain shanks.

It is an object of this invention to provide apparatus for setting fasteners of the above described type using pins having a threaded shank.

It is still another object of this invention to provide apparatus for setting a fastener of the above described type using a pin in which the shank can be plain, with pull grooves, or threaded.

It is an object of this invention to provide apparatus for setting a fastener of the above described type having means for forming a pull groove in the shank of the pin.

It is a further object of this invention to provide a method for setting fasteners of the above described type using pins without preformed pull grooves on the shank.

It is another object of this invention to provide a method for setting fasteners of the above described type using pins having plain shanks.

It is an object of this invention to provide a method for setting fasteners of the above described type using pins having a threadable shank.

In some applications it is desired that the excess portion of the shank of the pin be severed from the remainder. In these cases a breakneck groove is provided in the shank of the pin. It wolud be advantageous to be able to set rivets of the latter type by use of a pin having a plain shank or without the preformed breakneck groove. The apparatus and method of this invention are applicable to the setting of a fastener having such a pin. Therefore, it is an object of this invention to provide apparatus for setting fasteners of the last described type using pins having plain shanks.

It is an object of this invention to provide apparatus for setting fasteners of the last described type using pins without preformed breakneck grooves in the shanks.

Still another object of this invention is to provide apparatus for setting a fastener of the last described type in which that apparatus has means for forming a breakneck groove in the shank of the pin.

It is an object of this invention to provide apparatus for setting a fastener of the last described type in which that apparatus has means for forming a single combined pull groove and breakneck groove in the shank of the pin.

It is another object of this invention to provide a method for setting fasteners of the last described type using pins without preformed breakneck grooves on the shank.

Other objects, features, and advantages of the present invention will become apparent from the subsequent description and the appended claims, taken in conjunction with the accompanying drawings, in which:

FIGURE 1 is a partial sectional view with some parts shown broken away and others shown partially in phantom of a portion of a pull gun assembly for setting rivets and embodying the features of this invention;

FIGURE 2 is a sectional view of the pull gun assembly shown in FIGURE 1 and taken substantially along the line 2—2;

FIGURE 6 is a fragmentary sectional view of a pull gun assembly having a modified chuck jaw assembly; and FIGURE 7 is a fragmentary sectional view of a pull gun assembly having another modification of a chuck jaw assembly.

Figure 3:
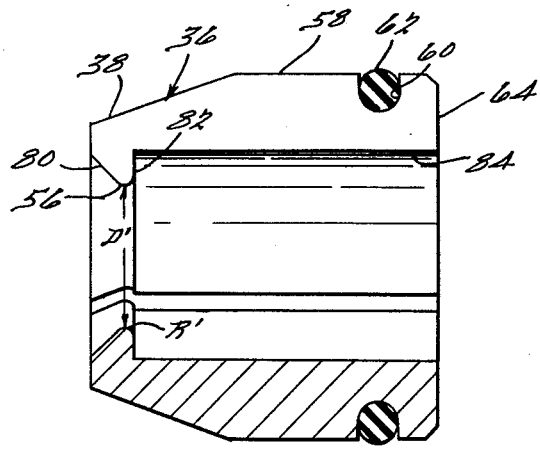
FIGURE 3 is an enlarged sectional view of the chuck jaw assembly as shown in FIGURE 1.

Generally, in the apparatus and method of this invention, a pull gun is used having a chuck jaw assembly on which is formed only a single tooth having a configuration adapted to form a pull groove on the shank of a pin; if the tail of the shank is desired to be severed from the remainder of the shank, then the single tooth can be used to form in the shank of the pin a combination pull groove and breakneck groove.

In FIGURE 1 is shown a preferred embodiment of the invention in which a pull gun assembly, generally indicated by the numeral 10 comprises a pull gun member 11, partially shown in phantom lines, which is operable with a nose assembly 12 for setting a fastener 14 disposed through a pair of aligned bores in a pair of metal plates or other type workpieces 16 and 18. The pull gun member 11 can be of a conventional type capable of applying a relative axial force such as described in the patent to L. C. Huck, No. 2,132,112.

The chuck jaw assembly 12 comprises a generally tubular-shaped external or outer anvil member 20 having an axially extending bore 21 and having radially extending ears 22 located near one end for lockable engagement with the end of the casing of the gun member 11 by means known to the art. The one end of the outer anvil 20 is open while the opposite end is substantially closed by an anvil portion 24 having a centrally disposed bore 26 located therein. The anvil portion 24 can have a variety of shapes depending upon the type of rivet to be set. Since the various anvil constructions are well known in the art, no detailed discussion of these will be attempted here.

A generally tubularly shaped chuck collet 28 is matable with and slidably disposed within the bore 21 of the outer anvil member 20 and is threadably secured at one end to a piston rod member 30 of the pull gun member 11. The pull gun member 11 is selectively operable to apply a relative axial force between the piston rod member 30 and the case of the pull gun member 11; by virtue of the interconnection described above the force of the pull gun member 11 results in a relative axial force between the collet 28 and the outer anvil 20.

The chuck collet member 28 has at the end opposite to that threadably engaged with the piston 30 a radially outwardly, axially inwardly extending tapered bore 32 having a predetermined inclination or taper for a purpose to be described. The tapered bore 32 terminates axially inwardly in a relief groove 34.

A chuck jaw assembly 36 is disposed within the collet 28 and has an externally disposed frusto conically shaped portion 38 having an angle of inclination substantially the same as the inclination of the inclined bore 32. The chuck jaw assembly 36 is urged in a direction axially outwardly of the collet 28 and into engagement with the tapered bore 32 by means of a coil spring member 40. The spring member 40 is radially disposed about a generally tubular chuck jaw follower sleeve member 44 and has one end bearing against a flange portion 42 thereof which in turn bears against a flat surface on the piston rod member 30 of the pull gun member 11. The other end of the spring member 40 bears against a flat, radially extending surface on a generally tubular chuck jaw follower member 46 which in turn bears against a generally circularly shaped chuck jaw follower cap and O-ring assembly 48 which in turn bears against a flange portion 50 of a generally tubular axially extending pin tail ejector tube 52. The flange portion 50 is in contact with a rear surface 64 on the chuck jaw assembly 36 while the tubular portion of the tube 52 extends axially rearwardly through the follower member 46 and the sleeve member 44 and communicates with an axial bore 53 in the piston member 30. The bore 30 extends through the gun member 11, for a purpose to be described.

The chuck jaw assembly 36 comprises a plurality of jaw members 54 (FIGURE 2) each of which has a single radially inwardly extending projection, or tooth 56 (FIGURE 3), peripherally disposed at the outward extremity of each of the jaw members 54. Each of the jaw members 54 has a rearwardly extending portion 58 having an externally disposed circumferential peripheral groove 60 therein. The chuck jaw assembly 36 has an O-ring or other resilent type spring member 62 disposed in the circumferential groove 60 to urge the chuck jaws 54 radially inwardly and thereby hold the individual jaws 54 together. As assembled in the collet 28, then, the chuck jaw assembly 36 has its rear surface 64 in contact with the flange on the pin-tail tube 52 and hence is urged axially outwardly into the tapered bore 32 by means of the spring 40.

Figure 4:
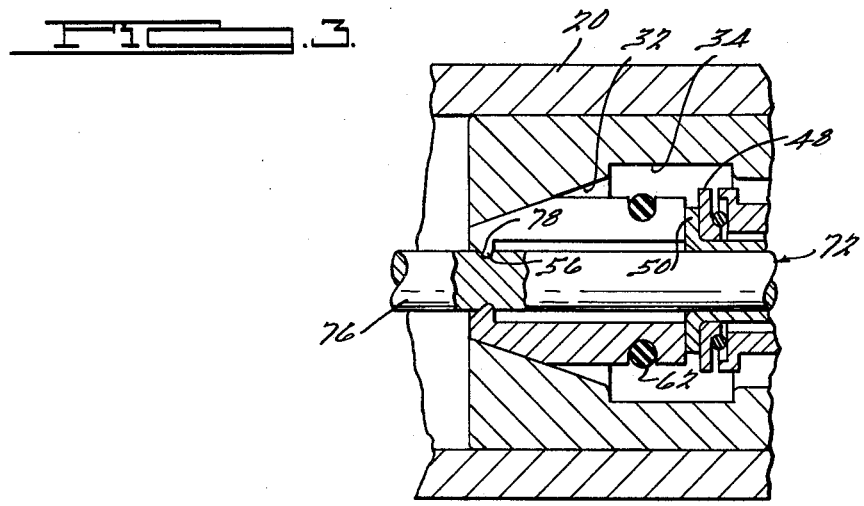
FIGURE 4 is a partial sectional view, with some parts broken away, showing the pull gun assembly of FIGURE 1 during one phase of the setting of a fastener.

For purposes of explanation, the workpieces 16 and 18 shall be assumed to have an accessible side, on the side of workpiece 18, and an inaccessible or blind side, on the side of workpiece 16. In operation (FIGURE 1) a sleeve member 66 of the fastener assembly 14, has a tubular portion 68 extending through the aligned bores in the plates 16 and 18 and has a flange portion 70 in abutment with the outer plate 18; a pin member 72, of the fastener assembly 14, has a shank portion 76 extending through the tubular portion 68 and terminates, on the blind side of the workpieces 16 and 18, in an enlarged head portion 74 which is in abutment with that end of the tubular portion 68. The pull gun assembly 10 is then brought proximate the rivet assembly 14 and the shank 76 is then inserted into the nose assembly 12 through the bore 26 in the anvil portion 24 of the anvil member 20 and through the tapered bore 32 in the collet member 28. As the shank 76 is thus inserted into the nose assembly 12, the chuck jaw assembly 36, which is normally urged axially outwardly into the tapered bore 32 by means of the spring 40 and radially inwardly to a contracted position by means of the O-ring 62, is forced axially rearwardly and hence radially outwardly by the shank 76 to an open position as shown in FIGURE 1. The relief groove 34 facilitates the radially outward displacement of the chuck jaw assembly 36. The shank 76 is inserted into the nose assembly 12 until the anvil portion 24 of the anvil member 20 is in engagement with the flange portion 70 of the sleeve member 66. At this time, the pull gun assembly 10 is in position to set the fastener member 14. By actuating the pull gun member 11, by means known in the art, a relative axial force is applied between the piston member 30 and the case of the gun and hence between the collet member 28 and the outer anvil member 12. Because of the action between the inclined surface of the tapered bore 32 and the frusto conical portion 38 of the chuck jaw assembly 36, this axial force on the collet 28 is transmitted into a combined radially inwardly and axially inwardly directed force on the chuck jaw assembly 36. The relative distribution of the force into the two components, as described, is dependent upon the angle of inclination of the inclined bore 32 and of the frusto conically shaped external surface portion 38. In the apparatus as shown in FIGURE 1, the angle of inclination is such that the radially inwardly directed force is sufficient to cause the single tooth 56 (FIGURE 4) to bite radially inwardly into the shank portion 76 of the pin member 72 and to minimize the tendency of the tooth 56 to slide axially inwardly over the surface of the shank 76 of the pin member 72. During the radial movement of the chuck jaw assembly 36, the collect 28 moves axially rearwardly but does not impart an axial component of force to the chuck jaw assembly 36 of sufficient magnitude to cause any substantial axial movement of the chuck jaw assembly 36. The axially rearward movement of the collet 28, and hence the radially inward movement of the jaws 54, continues until the chuck jaws 54 close forming then a substantially solid single member having then a single tooth. At this time then the radially inwardly directed component of force is eliminated since the chuck jaws 54 are no longer able to move radially inwardly and the total axial pulling force applied to the collet 28 is then applied to the chuck jaw assembly 36 and hence to the shank 76. At this time (FIGURE 4) the tooth 56 is embedded within a groove 78 formed within the shank 76 of the pin member 72. The axial force is continued until the blind head is formed against the work member 16 and an increase in axial force is applied until the shank 76 is severed in tension at the groove 78. Thus the groove 78, formed by the chuck jaw assembly 36, acts as a combined pull groove and breakneck groove. The pin-tail or that portion of the shank 76 which is severed passes rearwardly through the aperture in the pin-tail ejector tube 52 and through the communicating bore 53 and out through an opposite end (not shown) of the pull gun member 11.

Figure 5:
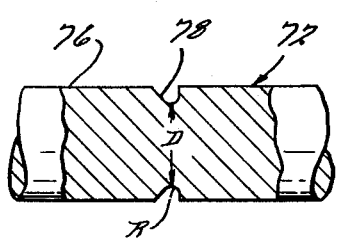
FIGURE 5 is a fragmentary sectional view of a pin of a fastener having a combined pulling and breakneck groove formed therein.

The shape of the tooth 56 of the chuck jaw assembly 36 is important since it must perform the dual function of providing an adequate cutting edge while still forming in the shank 76 of the pin 72 an ideal breakneck groove. The range of axial forces at which various fasteners or rivets can be set is well known in the art. Therefore, it follows that the breackneck groove formed in the shank of the pin should be such as to cause the pin to sever at an axial force higher than that required to set the fastener. The magnitude of the latter axial load will depend upon several factors. Looking now to FIGURE 5, a blown up cross sectional view of the shank 76 of the rivet pin 72 is shown in which a combined gripping and breakneck groove 78 has been formed. The tensile force at which that pin will fail at that point will depend upon the type of material, the hardness of the material, the root diameter $D$ of the groove 78 and the radius $R$ at the base of the root. The root diameter $D$ can be fixed by fixing the diameter $D'$ (FIGURE 3) to which the chuck jaw assembly 36 closes. Also the radius $R$ can be fixed by fixing the blend radius R' at the tip of the tooth 56. Thus for a pin of a given material and hardness the axial load at which the pin will sever is a function of the diameter D' to which the chuck jaw assembly 36 closes and also of the blend radius R' at the tip of the tooth 56. Since various sized fasteners require various sized chuck jaw assemblies, the exact diameter D' and blend radius R' will vary; however, once the ideal breakneck groove 78 is determined for a given type fastener, this dimensional relationship is then translated to the formation of the tooth 56 of the chuck jaw assembly 36.

In the chuck jaw assembly 36 shown in FIGURE 3, the forward face 80 of the tooth 56 is inclined axially rearwardly at an angle of 45° with regard to the vertical while a rear face 82 extends vertically radially inwardly. The radius R' then blends the juncture of the front face 80 and the rear face 82. It can then be appreciated that in the embodiment as shown in FIGURE 3 the inclination of the front face 80 facilitates the insertion of the shank 76 of a pin 72 of a fastener assembly 14 while the rear vertical face 82 provides a surface which facilitates the application of an axial load to the shank 76 of a pin 72 without axial slippage.

With the apparatus as described above, a fastener of the type discussed can be set in a novel manner since the combined pull groove and breakneck groove is formed while the fastener is located in the workpieces. With conventional rivets and apparatus the groove or grooves are formed during the fabrication of the pin.

A modification of the chuck jaw assembly 36 as shown in FIGURE 3 can be seen in FIGURE 6. There the chuck jaw assembly 36a has a tooth 56a with a profile having a vertically radially inwardly extending front face portion 80a and a rear portion 82a inclined radially inwardly and axially outwardly. The front surface 80a and the rear inclined surface 82a are joined by a blend radius Ra'. With the construction as shown in FIGURE 6, the shank 76 of the pin 72 will be severed at a point closer to the flange 70 of the sleeve 66 than would be the case with the tooth profile 56 as shown in FIGURE 3.

Looking now to FIGURE 7, a chuck jaw assembly 36b has a tooth 56b having a profile in which the front surface 80b is inclined axially inwardly towards a rear surface 82b which is inclined axially outwardly. The surfaces 80b and 82b are inclined towards each other so as to define an included angle of approximately 45°. The front inclined surface 80b and the rear inclined surface 82b are joined by a blend radius Rb'. The tooth 56b of FIGURE 7 affords a compromise between the tooth 56a as shown in FIGURE 6 and the tooth 56 as shown in FIGURE 3 and provides that the shank 76 of the pin 72 be clipped at a point intermediate to that as done by the embodiments shown in FIGURES 3 and 6.

In FIGURES 3 and 6 the chuck jaw assemblies therein each have plain surfaced bores 84 and 84a respectively extending axially rearwardly from the termination of the rear face 82 and 82a respectively. In the embodiment as shown in FIGURE 7 the axially rearwardly extending surface 84b is provided with a plurality of small teeth or serrations 86. The teeth or serrations 86 facilitate gripping of the shank 76 of the pin 72 thereby lessening any tendency for slippage of the tooth 36b during the setting of the fastener 14. The serrations 86 as shown in conjunction with the embodiment in FIGURE 7 could be used in either of the embodiments shown in FIGURES 3 and 6.

It can be appreciated that while, in each of the embodiments discussed above, a pin having a plain or smooth shank as shown the features of the invention therein disclosed are applicable to pins having shanks which are threaded or have other variations in form. Note also that, while the apparatus and method of this invention were shown with a particular fastener, it can be seen that the principles set forth are equally applicable to any type of multiple component fastener comprising a pin and a collar, sleeve, or generally tubular member and which is set by the application of a relative axial force therebetween.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. Apparatus for setting a fastener including a pin and a sleeve by providing an axial force relative to the pin and the sleeve comprising a generally tubular anvil member having a portion for engaging the sleeve, a generally tubular collet member slidably disposed within said anvil member and being movable axially relative to said anvil member and having a forward portion with an axial bore tapered radially outwardly and axially inwardly at a predetermined angle of inclination, a chuck jaw assembly comprising a plurality of radially disposed chuck jaw members movable to and from an opened and closed position responsively to axial movement of said collet member and having a frusto conically shaped forward portion with an angle of inclination substantially equal to said predetermined angle of inclination of said tapered bore, said chuck jaw assembly having said frusto conically shaped portion matably disposed in said tapered bore whereby axial movement of said collet member in one direction imparts radially inwardly and axially rearwardly directed components of force to said chuck jaw members, said chuck jaw assembly having a radially inwardly extending tooth peripherally disposed at the outer end of said frusto conically shaped portion, said predetermined angle of inclination having a magnitude to provide said radially and axially directed components of force in relative magnitudes to cause said chuck jaw members to move to said closed position and hence said tooth to move radially inwardly into the surface of the pin of the fastener to form a combined pulling and breakneck groove responsively to axially rearward movement of said collet, and means for applying an axial force through said combined pulling and breakneck groove relative to said collet and said anvil and for moving said collet axially relative to said anvil.

2. Apparatus for setting a fastener including a pin and a sleeve by providing an axial force relative to the pin and the sleeve comprising a generally tubular anvil member having a portion for engaging the sleeve, a generally tubular collet member slidably disposed within said anvil member and being movable axially relative to said anvil member and having a forward portion with an axial bore tapered radially outwardly and axially inwardly at a predetermined angle of inclination, a chuck jaw assembly comprising a plurality of radially disposed chuck jaw members movable to and from an opened and closed position responsively to axial movement of said collet member and having a frusto conically shaped forward portion with an angle of inclination substantially equal to said predetermined angle of inclination of said tapered bore, said chuck jaw assembly having said frusto conically shaped portion matably disposed in said tapered bore whereby axial movement of said collet member in one direction imparts radially inwardly and axially rearwardly directed components of force to said chuck jaw members, said chuck jaw assembly having a radially inwardly extending tooth peripherally disposed at the outer end of said frusto conically shaped portion, a spring member radially disposed about said chuck jaw assembly for urging said chuck jaw members radially inwardly toward said closed position, spring means operatively associated with said collet member and said chuck jaw assembly for urging said chuck jaw assembly axially outwardly and said frusto conically shaped forward portion into engagement with said tapered bore in said forward portion of said collet member, said predetermined angle of inclination having a magnitude to provide said radially and axially directed components of force in relative magnitudes to cause said chuck jaw members to move to said closed position and hence said tooth to move radially inwardly into the pin of the fastener responsively to axial rearward movement of the said collet, said tooth terminating at its radially innermost portion in a radius having a magnitude selected in accordance with the magnitude of the diametrical distance across said tooth when said chuck jaw members are in said closed position, to provide a groove in the pin of the fastener at which the pin will sever at an axial force greater than that required to set the fastener and means for applying an axial force relative to said collet and said anvil and for moving said collet axially relative to said anvil.

3. Apparatus for setting a fastener including a pin and a sleeve by providing an axial force relative to the pin and sleeve comprising a generally tubular anvil member having a portion for engaging the sleeve, a generally tubular collet member slidably disposed within said anvil member and being movable axially relative to said anvil member, a chuck jaw assembly comprising a plurality of radially disposed chuck jaw members movable to and from an opened and closed position responsively to axial movement of said collet member and having a radially inwardly extending tooth peripherally disposed at the outer end of said chuck jaw assembly for engaging the pin of the fastener, said tooth terminating at its radially innermost portion in a radius having a magnitude selected in accordance with the magnitude of the diametrical distance across said tooth when said chuck jaw members are in said closed position to provide a groove in the pin of the fastener at which the pin will sever at an axial force greater than that required to set the fastener, said chuck jaw assembly having a frusto conically shaped portion at said outer end matably disposed in an axial bore in a forward portion of said collet member, said axial bore being tapered radially outwardly and axially inwardly at a predetermined angle of inclination such as to impart to said chuck jaw members a radially inwardly directed component of force and an axially rearwardly directed component of force having magnitudes in a preselected relationship such as to cause said chuck jaw members to move to said closed position and hence said tooth to move radially inwardly into the pin of the fastener responsively to axial rearward movement of said collet, and means for applying an axial force relative to said collet and said anvil for moving said collet axially relative to said anvil.

4. Apparatus for setting a fastener including a pin and a sleeve by providing an axial force relative to the pin and the sleeve comprising a chuck jaw assembly including a plurality of radially disposed chuck jaw members defining a radially inwardly extending peripheral tooth at their outer end, actuating means responsive to an axial force and including said chuck jaw members for causing movement of said chuck jaw members to a closed position to form with said tooth a combined pulling and breakneck radial groove in the pin of the fastener, and means associated with said chuck jaw assembly for applying an axial force to said chuck jaw assembly and hence to the pin of the fastener through the engagement of said tooth with the combined pulling and breakneck groove.

5. Apparatus for setting a fastener including a pin and a sleeve by providing an axial force relative to the pin and the sleeve comprising a chuck jaw assembly including a plurality of radially disposed chuck jaw members defining a radially inwardly extending peripheral tooth at their outer end, actuating means responsive to an axial force and including said chuck jaw members for causing movement of said chuck jaw members to a closed position to form with said tooth a combined pulling and breakneck radial groove in the pin of the fastener, said tooth terminating at its radially innermost portion in a radius having a magnitude selected in accordance with the magnitude of the diametrical distance of said tooth when said chuck jaw members are in said closed position to provide a groove in the pin of the fastener at which the pin will sever at an axial force greater than that required to set the fastener, and means associated with said chuck jaw assembly for applying an axial force to said chuck jaw assembly and hence to the pin of the fastener through the engagement of said tooth with the combined pulling and breakneck groove.

6. Apparatus for setting a fastener including a pin and a sleeve by providing an axial force relative to the pin and the sleeve comprising a chuck jaw assembly including a plurality of radially disposed chuck jaw members defining a radially inwardly extending peripheral tooth at their outer end, actuating means including said chuck jaw members for causing movement of said chuck jaw members to an opened position upon insertion of the pin of the fastener into said chuck jaw assembly and responsive to an axial force for causing movement of said chuck jaw members to a closed position to form with said tooth a combined pulling and breakneck radial groove in the pin of the fastener, gripping means disposed radially outwardly from the tip of said tooth and extending axially rearwardly from said tooth and internally of said chuck jaw assembly for grippingly engaging the pin of the fastener when said chuck jaw assembly is in said closed position, and means associated with said actuating means and with said chuck jaw assembly for applying an axial force to said actuating means and to said chuck jaw assembly and hence to the pin of the fastener through the engagement of said tooth with the combined pulling and breakneck groove.

7. Apparatus for setting a fastener including a pin and a sleeve by providing an axial force relative to the pin and the sleeve comprising a chuck jaw assembly including a plurality of radially disposed chuck jaw members defining a radially inwardly extending peripheral tooth at their outer end, actuating means including said chuck jaw members for causing movement of said chuck jaw members to an opened position upon insertion of the pin of the fastener into said chuck jaw assembly and responsive to axial force for causing movement of said chuck jaw members to a closed position to form with said tooth a combined pulling and breakneck radial groove in the pin of the fastener, said tooth having an axially rearwardly and radially inwardly extending front surface portion and a radially inwardly vertically extending rear portion intersecting said forward portion in a radius having a magnitude selected in accordance with the magnitude of the diametrical distance across said tooth when said chuck jaw members are in said closed position to provide the radial groove in the pin of the fastener such that the pin will sever at an axial force greater than that required to set the fastener and means associated with said actuating means with said chuck jaw assembly for applying an axial force to said actuating means and to said chuck jaw assembly and hence to the pin of the fastener through the engagement of said tooth with the combined pulling and breakneck groove.

8. Apparatus for setting a fastener including a pin and a sleeve by providing an axial force relative to the pin and the sleeve comprising a chuck jaw assembly including a plurality of radially disposed chuck jaw members defining a radially inwardly extending peripheral tooth at their outer end, actuating means including said chuck jaw members for causing movement of said chuck jaw members to an opened position upon insertion of the pin of the fastener into said chuck jaw assembly and responsive to an axial force for causing movement of said chuck jaw member to a closed position to form with said tooth a combined pulling and breakneck radial groove in the pin of the fastener, said tooth having an axially rearwardly and radially inwardly extending front surface portion and a radially inwardly vertically extending rear portion intersecting said forward portion in a radius having a magnitude selected in accordance with the magnitude of the diametrical distance across said tooth when said chuck jaw members are in said closed position to provide a groove in the pin of the fastener at which the pin will sever at an axial force greater than that required to set the fastener, gripping means disposed radially outwardly from the tip of said tooth and extending axially rearwardly from said tooth and internally of said chuck jaw assembly for grippingly engaging the pin of the fastener when said chuck jaw assembly is in said closed position, and means associated with said actuating means and with said chuck jaw assembly for applying an axial force to said actuating means and to said chuck jaw assembly and hence to the pin of the fastener through the engagement of said tooth with the combined pulling and breakneck groove.

9. Apparatus for setting a fastener including a pin and a sleeve by providing an axial force relative to the pin and the sleeve comprising a chuck jaw assembly including a plurality of radially disposed chuck jaw members defining a radially inwardly extending peripheral tooth at their outer end, actutaing means including said chuck jaw members for causing movement of said chuck jaw members to an opened position upon insertion of the pin of the fastener into said chuck jaw assembly and responsive to an axial force for causing movement of said chuck jaw members to a closed position to form with said tooth a combined pulling and breakneck radial groove in the pin of the fastener, gripping means disposed radially outwardly from the tip of said tooth and extending axially rearwardly from said tooth and internally of said chuck jaw assembly for grippingly engaging the pin of the fastener when said chuck jaw assembly is in said closed position, said tooth having a radially inwardly vertically extending front surface portion intersecting an axially outwardly and radially inwardly extending rear portion in a radius having a magnitude selected in accordance with the magnitude of the diametrical distance across said tooth when said chuck jaw members are in said closed position to provide a groove in the pin of the fastener at which the pin will sever at an axial force greater than that required to set the fastener, and means associated with said actuating means and with said chuck jaw assembly for applying an axial force to said actuating means and to said chuck jaw assembly and hence to the pin of the fastener through the engagement of said tooth with the combined pulling and breakneck groove.

10. Apparatus for setting a fastener including a pin and a sleeve by providing an axial force relative to the pin and the sleeve comprising a chuck jaw assembly including a plurality of radially disposed chuck jaw members defining a radially inwardly extending peripheral tooth at their outer end, actuating means including said chuck jaw members for causing movement of said chuck jaw members to an opened position upon insertion of the pin of the fastener into said chuck jaw assembly and responsive to an axial force for causing movement of said chuck jaw members to a closed position to form with said tooth a combined pulling and breakneck radial groove in the pin of the fastener, gripping means disposed radially outwardly from the tip of said tooth and extending axially rearwardly from said tooth and internally of said chuck jaw assembly for grippingly engaging the pin of the fastener when said chuck jaw assembly is in said closed position, said tooth having a radially inwardly and axially rearwardly extending front surface portion intersecting an axially outwardly and radially inwardly extending rear portion in a radius having a magnitude selected in accordance with the magnitude of the diametrical distance across said tooth when said chuck jaw members are in said closed position to provide a groove in the pin of the fastener at which the pin will sever at an axial force, greater than that required to set the fastener, and means associated with said actuating means and with said chuck jaw assembly for applying an axial force to said actuating means and to said chuck jaw assembly and hence to the pin of the fastener through the engagement of said tooth with the combined pulling and breakneck groove.

11. Apparatus for setting a fastener including a pin by applying an axial force to the pin comprising jaw means including a radially defined tooth for forming a combined pulling and breakneck groove in the pin of the fastener, means including said jaw means for causing movement of said tooth from an open position to a fixed closed position to form in said closed position the combined pulling and breakneck groove in the pin, said jaw means including means for preventing radially inward movement of said tooth beyond said closed position, and means for applying an axial force to said jaw means and hence to the pin of the fastener through the engagement of said tooth with the combined pulling and breakneck groove.

12. Apparatus for setting a fastener including a pin by applying an axial force to the pin comprising jaw means including a radially defined tooth for forming a combined pulling and breakneck groove in the pin of the fastener, means including said jaw means for causing movement of said tooth from an open position to a closed position to form the combined pulling and breakneck groove in the pin, said jaw means including means for preventing radially inward movement of said tooth beyond said closed position, said tooth terminating at its radially innermost portion in a radius having a magnitude selected in accordance with the magnitude of the diametrical distance across said tooth in said closed position to provide a groove in the pin of the fastener to sever at an axial force greater than that required to set the fastener, and means for applying an axial force to said jaw means and hence to the pin of the fastener through the engagement of said tooth with the combined pulling and breakneck groove.

13. Apparatus for setting a fastener including a pin by applying an axial force to the pin comprising: jaw means for forming a combined pulling and breakneck groove in the pin of the fastener, said jaw means including a radially defined tooth having an opened and closed position and having its radially innermost portion defining the contour of the combined pulling and breakneck groove in said closed position, said tooth defining an opening of a preselected dimension in said closed position and having a preselected radius at the termination of said radially innermost portion, the magnitudes of said dimension and of said radius being selected relative to each other so that the pin will sever at the combined pulling and breakneck groove at an axial force having a preselected magnitude greater than that required to set the fastener, means for moving said jaw means to said opened and said closed positions and means for applying an axial force to said jaw means and hence to the pin of the fastener through the engagement of said tooth with the combined pulling and breakneck groove.

References Cited in the file of this patent

UNITED STATES PATENTS

| | | |
|---|---|---|
| 1,920,362 | Dean | Aug. 1, 1933 |
| 2,531,049 | Huck | Nov. 21, 1950 |
| 3,055,528 | Seifert | Sept. 25, 1962 |